United States Patent [19]
Stump et al.

[11] 3,783,908

[45] Jan. 8, 1974

[54] HELICALLY WOUND TUBES

[75] Inventors: Paul W. Stump, North Olmsted; James A. Huber, Strongsville; John M. Lipinski, Cleveland, all of Ohio

[73] Assignee: Clevepak Corporation, Cleveland, Ohio

[22] Filed: Sept. 20, 1972

[21] Appl. No.: 290,579

Related U.S. Application Data

[62] Division of Ser. No. 172,010, Aug. 16, 1971, abandoned, which is a division of Ser. No. 842,298, July 16, 1969, Pat. No. 3,620,869.

[52] U.S. Cl. ............................... 138/144, 138/154
[51] Int. Cl. .............................................. F16l 9/16
[58] Field of Search .................. 138/150, 144, 129; 93/77 R, 77 CL, 80, 94 R; 156/190, 195

[56] References Cited
UNITED STATES PATENTS

| | | | |
|---|---|---|---|
| 1,885,587 | 11/1932 | Burton | 156/190 X |
| 3,623,929 | 11/1971 | Wannamaker et al. | 156/195 X |
| 3,716,435 | 2/1973 | Jensen et al. | 156/195 |

Primary Examiner—Jerry W. Myracle
Attorney—James G. Watterson

[57] ABSTRACT

A helically wound tube comprised of sheet-like plies including a liner and a plurality of body plies. The liner and a first surrounding body ply are interwoven along a helical butt joint defined by adjacent edges of the surrounding body ply, and the liner forms a helical lap joint. The tube is continuously formed and an interior protective coating is concurrently applied to the tube as an airless spray of coating material comprising 100 per cent solids in a liquid state, which hardens substantially on contact with the tube.

5 Claims, 6 Drawing Figures

PATENTED JAN 8 1974

INVENTORS
PAUL W. STUMP
JAMES A. HUBER
JOHN M. LIPINSKI

BY Watts Hoffmann,
Fisher & Heinke
ATTORNEYS

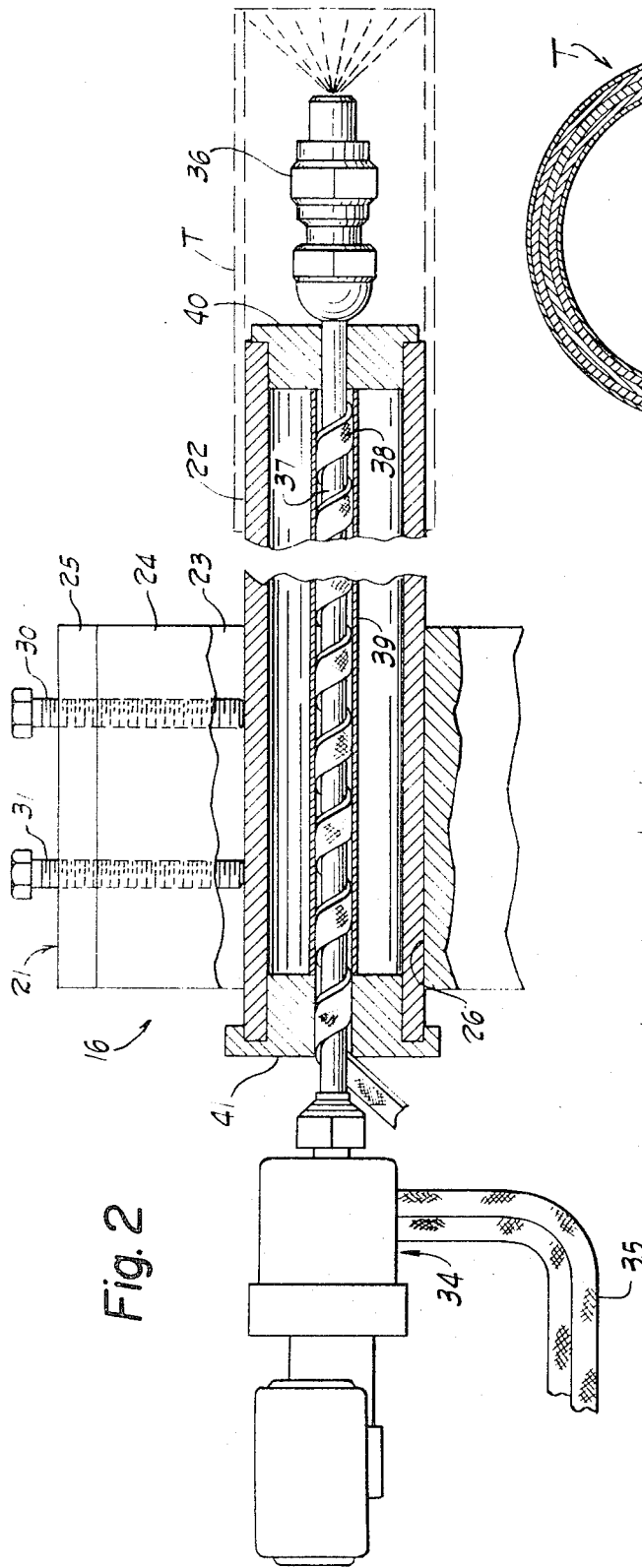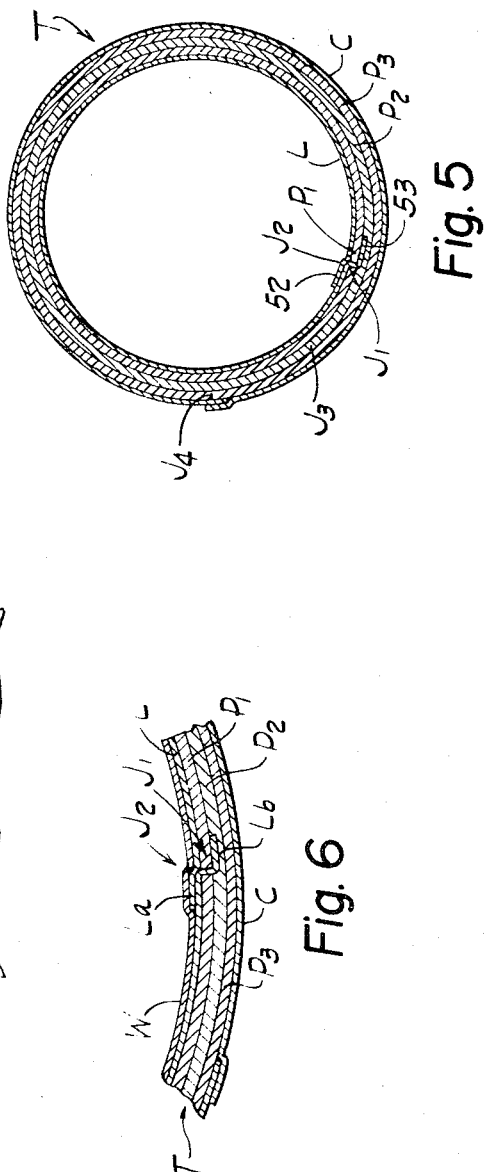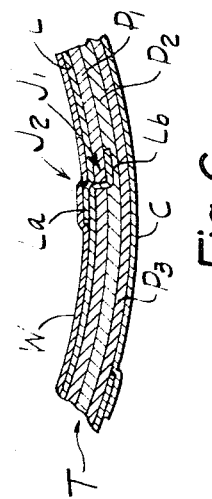

HELICALLY WOUND TUBES

This application is a division of co-pending application Ser. No. 172,010, filed Aug. 16, 1971 now abandoned, which in turn is a division of application Ser. No. 842,298, filed July 16, 1969, now U.S. Pat. No. 3,620,869.

The present invention relates to helically wound tube-like articles, such as containers, and methods of and apparatus for forming such articles and coating the interiors thereof.

Tubes formed by helically wound sheet-like plies have a wide variety of uses. If suitably sealed against leakage, such tubes are particularly useful as containers for various products, including liquids and the like, and especially foodstuffs. Typically, such tubes are formed of paper plies, or like material, which individually lack high inherent strength. Adequate strength for specific purposes is obtained by the use of multiple plies of appropriate quality and thickness, and by the manner in which the tube is wound to produce a particular joint construction at adjacent ply edges. For example, skived joints and overlap joints are relatively strong, while butt joints are weak. However, paper with skived edges is expensive and overlapped joints are troublesome if covers must be seamed on the end of a tube, because of the double thickness of the tube wall at the overlap. Butt joints permit the use of less expensive paper and produce a uniform wall thickness, but in addition to being weaker can also be expected to leak if in direct contact with liquids or with products of high moisture content.

The present invention embodies a novel tube and manner of winding the same, providing an inherently tighter and stronger joint at the inner surface of the tube, and further embodies a novel method of applying a protective coating and sealant to the inner ply concurrently with the continuous formation of the tube.

The tube of this invention includes a plurality of plies, including a relatively thin inner ply or liner. In a preferred embodiment, the tube is comprised of a thin inner ply, three thicker body plies and a thin cover ply, typically a label. In accordance with this invention, an inner ply is wound in a manner that interweaves an edge of the inner ply or liner between an otherwise typical butt joint of a surrounding ply, and which laps the opposite edge of the inner ply across the joint, within the tube. The interwoven edge extends beyond the joint on the external surface of the surrounding ply and is adhered thereto, providing a second overlap. This double overlap at the joint, on both sides of the surrounding ply, adds substantial strength to the surrounding ply over and above that which is due merely to the combined thickness of the two plies, and in addition establishes an effective seal because of the tortuous path and successive adhered surfaces past which moisture or liquid must travel to permeate the joints of the plies. In a preferred embodiment, subsequent body plies are wound, preferably with butt joints and a cover ply is typically applied, with an overlapped joint. The inner ply and cover ply are both kept very thin, relative to the body plies. As a result, the overall wall thickness of the tube is substantially uniform, notwithstanding the overlap at the joints of the inner and cover plies. The added strength attained through this construction permits the manufacturer several attractive options. For example, less expensive paper of somewhat reduced strength can be used while attaining ultimate tube strength equivalent to more expensive, stronger paper with conventional butted joints; a thinner wall thickness can be used in a tube, with a given strength or quality of paper, to attain the same tube strength; or a higher strength tube can be constructed using a given quality and thickness of plies. By virtue of the strength of the tubes embodying the present invention, a manufacturer can produce a helically wound tube of equal wall thickness to that of a convolutely wound tube, and which will be of essentially equal strength, but which can be manufactured by a continuous process and at a higher production rate.

Tubes of the type described are continuously formed by helically winding plies in strip form on a mandrel, and the formed portion is progressively advanced axially from the mandrel during winding. In accordance with the present invention, an internal coating is applied to the tube downstream from the mandrel as an airless spray. The coating material is a liquified material that will quickly solidify upon contact with the tube to form a substantially moisture impermeable coating that protects the inner ply and the joint thereof against leakage. A wax or wax-like material or a blend of materials consisting entirely of solids, i.e., containing no vehicle or solvent and liquifiable at elevated temperatures, is especially suitable as a coating material. It is applied as an airless spray at a temperature at which it is liquid. The tube is maintained at a temperature, lower than that of the liquid, at which the material will quickly solidify. By using an airless spray, heat dissipation during application is minimized, assuring that the material remains in a liquid state until it contacts the tube so that it will wet the tube wall and form a continuous, strongly adhered, moisture barrier. By utilizing 100 per cent solids, evaporating or curing of a solvent or vehicle for the coating material is avoided, along with the accompanying fumes, time requirements and application of heat typically involved. As a result, equipment requirements, processing line length and production costs can be minimized.

The tube is formed on equipment constructed to insure that the coating material is maintained in a heated liquid state prior to spraying, and to insure that the tube is maintained sufficiently cool for the material to solidify quickly upon contact. To this end, conduit portions supplying coating material to a spray head are locally heated and are thermally insulated from the forming mandrel and tube.

From the foregoing it will be apparent that a principal object of the present invention is the provision of a new and improved tube of high strength and low cost and the provision of methods and apparatus for forming the tube and for applying an internal coating to a continuously formed tube.

Other objects, features and advantages of the present invention will be apparent from the following detailed description made with reference to the accompanying drawings which form a part of the specification, and in which:

FIG. 2 is a partial side elevational view, with parts removed, on an enlarged scale, of the apparatus of FIG. 1, showing a winding mandrel and spraying apparatus;

FIG. 5 is a transverse sectional view of a tube embodying the present invention, illustrating the construction and arrangement of the plies and helical joints between adjacent ply edges; and FIG. 6 is an enlarged fragmentary view of FIG. 5, showing constructional features.

Figure 1:
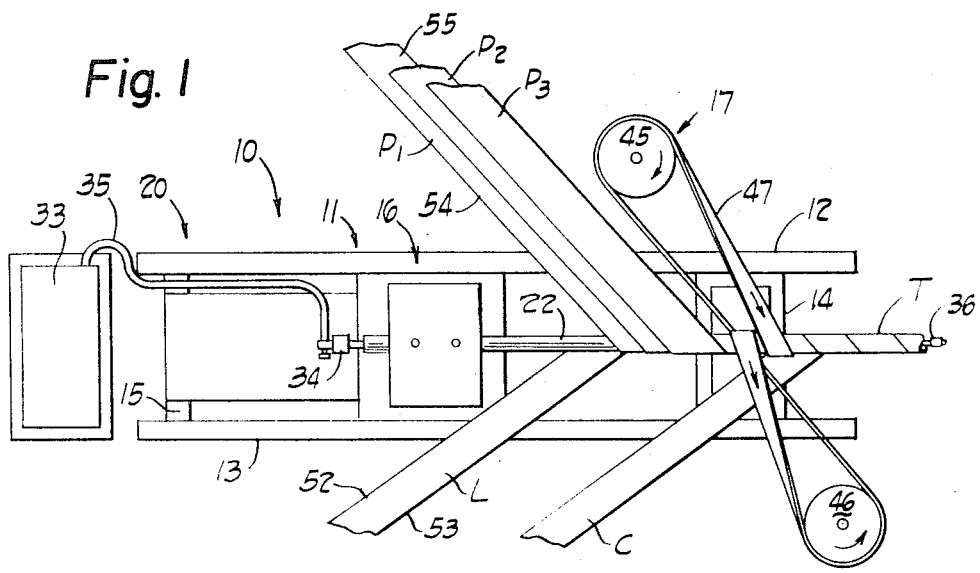
FIG. 1 is a top plan view of apparatus for winding a tube embodying the present invention and for coating the interior of a tube as it is formed.

A tube forming apparatus 10 is illustrated in FIGS. 1 and 2. The apparatus 10 includes a frame-like base 11 having parallel floor or bench engaging support members 12, 13 and lateral supporting frame structures 14, 15, shown diagrammatically. The apparatus 10 also includes a tube winder head 16, a tube winder 17, and coating apparatus 20 for providing a coating on the inside of the tube formed by the apparatus 10. The winder head 16 includes a support frame 21 (FIG. 2), extending upwardly from the base 11, and a stationary mandrel 22. The mandrel 22 is a rigid, smooth-walled, tubular member about which a tube T is continuously formed. The support frame 21 includes vertically extending frame members 23, 24 and a lateral plate-like member 25 extending between the upper ends of the frame members 23, 24. The winder head additionally includes a support surface 26 for the mandrel 22. The mandrel 22 extends from the frame 21 and is secured at one end by set screws 30, 31 which are received in threaded openings in the lateral member 25 and extend into engagement with the mandrel, clamping it against a support surface 26.

The coating apparatus 20 is constructed to spray a protective coating material and sealant, e.g., a moisture barrier, upon the inside of a formed portion of a tube T adjacent the end of the mandrel 22. Coating apparatus 20 includes a reservoir 33 for material to be sprayed, a valve-like control gun 34 communicating with the reservoir 33 through a conduit 35, and a spray nozzle 36 disposed at the projecting end of the mandrel 22 and connected to the control gun 34 by a nozzle extension tube 37. Material in the reservoir is either maintained under pressure or is pumped to the spray nozzle. A preferred nozzle is stationary and produces a cone-shaped, 360°, spray pattern, which, because the tube is continuously rotated and advanced at a constant speed during formation, thoroughly and uniformly coats the entire inside surface of the tube as the formed tube advances from the mandrel end. The nozzle extension tube 37 is highly thermally conductive (e.g., in a preferred embodiment, it is constructed of copper) and is supported within the mandrel 22 by end plugs 40, 41 attached at opposite ends of the mandrel 22, so that the mandrel 22 forms a closed cylindrical chamber through which the tube 37 extends, as shown in FIG. 2. Heat tape 38, e.g., electrical-resistance heating elements imbedded in a carrier strip, is wound about the extension tube 37 within the mandrel 22. Both the tube 37 and the tape 38 are encased in an asbestos tube 39 within the mandrel to insulate the mandrel from heat from the tube 37 and tape 38. The dead air space between the tube 39 and the mandrel also serve to insulate the mandrel from the hotter tube 37 and tape 38. The tape 38 is connected to a source of electric current by leads, not shown. The method of coating the inside of a tube formed on the apparatus is described subsequently.

The tube winder 17 is schematically illustrated, is of conventional construction, and includes pulleys 45, 46 on opposite sides of the mandrel, around which a belt 47 is trained. A continuous tube T is shown extending from the mandrel, being formed from a plurality of webs L, P1, P2, P3, and C that form plies, which, in helically wound form, constitute the tube. The belt 47 includes one reach which extends directly between the pulleys and a second reach which is looped about the tube T. When the pulleys are driven to drive the belt in the direction of the arrows in FIG. 1, the tube T is rotated about the longitudinal axis of the mandrel 22 and advanced axially of the mandrel 22, away from the support frame 21. The belt 47 is angularly disposed relative to the mandrel 22 to advance the tube T at a rate that properly positions the turns of the plies in proper adjacent relationship.

Figure 3:
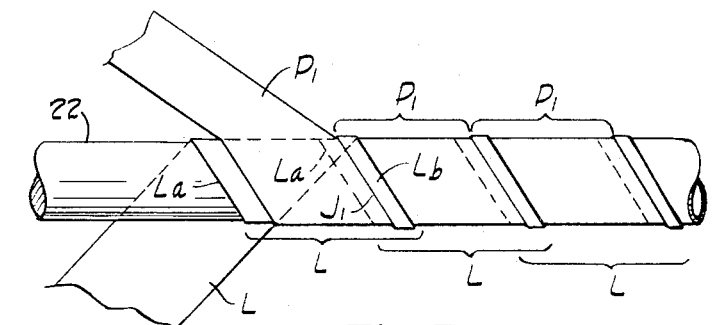
FIG. 3 is a diagrammatic elevaional view of an intermediate stage of the winding of a tube embodying the present invention.
Figure 4:
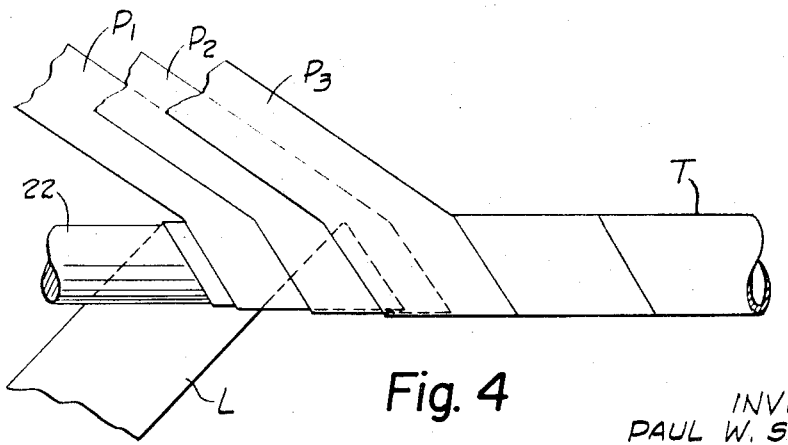
FIG. 4 is a diagrammatic view similar to FIG. 3 illustrating the manner in which a preferred embodiment of a tube is completely wound.

FIGS. 1, 3 and 4 illustrate the manner in which the tube T is formed. Thin webs L and C, which respectively form an inner ply or liner and a label or cover ply, are supplied from one side of the mandrel 22, and thicker webs P1, P2, P3, which respectively form body plies of the tube are, for convenience, supplied from the opposite side of the mandrel. In order to produce a tube with the particular structural form shown in FIGS. 5 and 6, specific relative dimensions and locations of the webs and adhesive areas must be established. A critical relationship exists between the inner ply L and the first body ply P1. For convenience, the remaining body plies or webs P2 and P3 are identical to ply P1 in size and shape. The liner or first ply L is substantially thinner than the body ply P1 to minimize thickness variations of the tube where the inner ply overlaps at the helical joint J1 formed at adjacent edges of the helically wound first ply. See FIGS. 3 and 6. The first ply L is also substantially wider than the ply P1 and the two are supplied to the mandrel so that ply P1 centrally overlies liner L, establishing extending marginal portions $L_a$ and $L_b$. The outer surface of the liner L and both surfaces of the ply P1 are coated with adhesive. Alternatively, the outer surface of ply P1 can be coated only adjacent the marginal portion $L_a$ of the liner to adhere the marginal portion $L_b$ in overlying relationship, since the second body ply is adhered by adhesive on its inner surface.

As the tube T is wound, the marginal portion $L_b$ and an adjacent marginal portion of ply P1 overlap the marginal portion $L_a$ of the preceding turn of the liner L (See FIG. 3). The marginal portion $L_b$ also overlaps a part of the preceding turn of the first ply P1. Each successive turn of the ply P1 essentially butts against the edge of the preceding turn, spaced therefrom only by the thickness of the liner ply L that extends outwardly between the edges from beneath the successive turn and overlies the preceding turn at $L_b$. This will be particularly apparent from the sectional view of the article shown in FIGS. 5 and 6. At least one additional body ply P2 is wound over ply P1, overlapping the joint J1 for strength and itself having a butt joint to keep the tickness of the tube wall substantially uniform. In the preferred embodiment, a third body ply P3 is applied in the same manner as the second ply and a thin cover or label ply C is applied with an overlap joint, all suitably glued to adhere to the preceding ply.

With more particular reference to the finished tube, as shown in section of FIGS. 5 and 6, the marginal portion $L_a$ of the inner ply forms a lap joint J2 on the inside of the container, and the marginal portion $L_b$ of the inner ply extends radially outward beneath the lap joint between the butt joint J1 of the first body ply P1, and then overlies the body ply P1, being secured by adhesive. This establishes a relatively long and tortuous path along which moisture must travel to get beyond the inner ply. In addition, the interwoven structure of the joint J1 is as strong as a lap or a skived joint. The second body ply P2 overlies ply P1 and marginal portion $L_b$ of the inner ply, and has a butt joint J3 displaced from joint J1. The third body ply P3 overlies the ply P2 and has a butt joint J4 displaced from the joint J3. The cover ply C is a label and has a lap joint J5. The inner ply and cover ply are quite thin with respect to the body plies and the total thickness of the tube wall and overlapping portions create only a small irregularity in the wall which will not interfere with the seaming of an end closure when the tube is cut into lengths and capped. A coating W is shown on the inside surface of the liner L in FIG. 6.

By way of example, a preferred embodiment of a tube T is comprised of an inner liner L of "4 point" paper, i.e., having a thickness of 0.004 inch; three body plies of "12 point" paper, i.e., having a thickness of 0.012 inch, and a label forming a cover ply of "2 point" paper. The inner ply is 6¼ inches wide and the body plies and cover ply are each 5½ inches wide, so that the extending marginal portions $L_a$, $L_b$ are each three-eighth inch wide. The entire outside surface of the liner L and both opposite surface of the first body ply P1 are coated with adhesive. The inside surface of each remaining ply is coated with adhesive. Each ply is adhered to the preceding ply as the plies are wound on the mandrel and the tube advanced, in a conventional manner.

In accordance with this invention, a protective coating such as a moisture barrier is sprayed through the stationary nozzle 36 of the continuously formed tube T as the tube is advanced from the mandrel 22. A critical factor for an optimum process is the use of a coating material that consists of 100 per cent solids at typical ambient temperatures to which the tube will be subjected, but which will liquify at temperatures somewhat above such ambient temperatures. Wax or wax systems, e.g., blends of waxes or wax and modifying agents such as resins have been found particularly suitable, and the material is heated in the reservoir 33 of the spray unit to a temperature above that at which it liquifies. The elevated temperature is substantially maintained along the extension tube 37 of the spray unit by the heat tape 38 to assure that the material is liquid at the time it is emitted from the nozzle 36. The coating material is supplied from the reservoir 33 at a high enough pressure to produce a relatively fine spray at the nozzle, within introducing or relying upon a flow of air in which to entrain the material. Such an airless spray reduces the tendency of the disbursed material to lose heat and solidify before it coats the tube. Even a flow of air that might be aspirated into the spray through an open mandrel is undesirable and the end plug 40 prevents air from being drawn into the tube.

One example of a suitable coating material is a wax blend consisting of 50 per cent by weight paraffin wax and 50 per cent by weight microcrystalline wax. In some instances the softness of this material is disadvantageous, in that it may transfer to the mandrel or cutters of the machinery. This problem can be largely overcome by using 100 per cent solids blends of waxes and compatible resins or polymers that can be liquified by heating to temperatures of 275° to 350° F, that solidify into tough, hard coatings. A suitable blend of this type consists of 25 percent by weight ethylene/vinyl acetate resin, such as Elvax 250 manufactured and sold by E. I. du Pont de Nemours & Company and 75 percent by weight fully refined, 155° F melting point, paraffin.

Ambient temperatures of the apparatus 10, especially the mandrel 22, and the tube T being formed, are kept below the temperature at which the coating material solidifies, in part by the insulating tube 39 and dead air space that surrounds both the extension tube 37 and heat tape 38. Thus, when the material contacts the tube it adequately wets the interior surface because of its liquid state, yet quickly solidifies because of the lower temperature of the tube. As a result, the tube can be cut into lengths a very short distance from the spray nozzle, eliminating any need for intermediate curing or evaporating steps that might be necessary for other types of coating materials and their accompanying requirements of time, space and equipment.

The above process and the apparatus described provide both a new and improved tube construction and a new and improved manner of applying an internal coating to a continuously formed helically wound tube. The tube itself has improved strength characteristics by virtue of the joint construction provided by the interwoven liner and first body ply, and the inner ply or liner is essentially impervious to liquid, not only because of the improved joint structure provided but also because of the internal wax coating. Because the coating material is 100 percent solids and is applied in liquid form as a hot airless spray, proper wetting and good coverage is assured. Maintenance of the tube at a lower temperature than that at which the coating material solidifies assures rapid hardening upon contact, facilitating a short processing line. This results in both an economical process and an improved product.

While the invention has been described with particularity in its preferred form, it will be understood that various modifications or alterations can be made therein without departing from the spirit and scope of the invention.

What is claimed is:

1. A helically wound cylindrical tube comprising:
    a. a helically wound liner ply;
    b. a helically wound body ply disposed about and adhered to said liner ply;
    c. said body ply having adjacent edges disposed in slightly spaced relationship to each other along a helical path;
    d. said liner ply including a first marginal portion along one edge and located on the inside of said tube, extending across said helical path, and adhered in overlapping relationship to liner material on one side of said path;
    e. said liner ply including a second marginal portion along an opposite edge from said first marginal portion, extending outward between said adjacent edges of said body ply and circumferentially beyond said helical path in an opposite peripheral direction from said first marginal portion;

f. said second marginal portion of said liner being adhered to an outer peripheral surface of said body ply.

2. A tube as defined in claim 1 wherein said liner ply is substantially thinner than said body ply, and including a third ply overlying said body ply and said second marginal portion of the liner ply, and adhered to both the body ply and said second marginal portion.

3. A tube as defined in claim 1 including a moisture barrier formed of a solidified wax-containing composition covering the inner surface of said liner ply.

4. A helically wound cylindrical tube adapted for use as a container, comprising: a fiber strip helically disposed to form a tubular body ply and a relatively thin strip helically disposed and adhered to the inside of the tubular body ply to form a liner ply; said body ply having edges disposed opposite each other along a helical path and in slightly spaced relationship; said strip forming the liner ply having first and second marginal portions along parallel sides of the strip; and said liner ply completely covering the inner surface of said body ply, extending between the adjacent edges thereof to locate said first edge portion of the liner ply strip on the outside of said tubular body ply flush against the surface thereof, and said second edge portion overlapping the liner ply adjacent the helical edges of the body ply.

5. A tubular member comprised of at least first, second and third strips of material helically wound and bonded one to the next, the first strip forming an inner or liner ply, the second strip being narrower and thicker than the first and surrounding all but a first marginal portion thereof along one edge, and the third ply surrounding the second, the pitch of the helical path of at least the first and second strips being substantially identical, opposite edges of said second strip helically disposed in opposed relationship, said first marginal portion of said first strip extending between the opposed and otherwise abutting edges of the second strip, overlying and bonded to a marginal portion of a convolution of the second strip, and a second marginal edge portion of said first strip underlying the otherwise abutting edges of said second strip in overlying relationship with and bonded to an adjacent one of its own convolutions, thereby forming a lap joint within the tube, said marginal edge portions of said first strip each extending in a peripheral direction opposite to that of the other.

* * * * *